United States Patent Office 3,388,772
Patented June 18, 1968

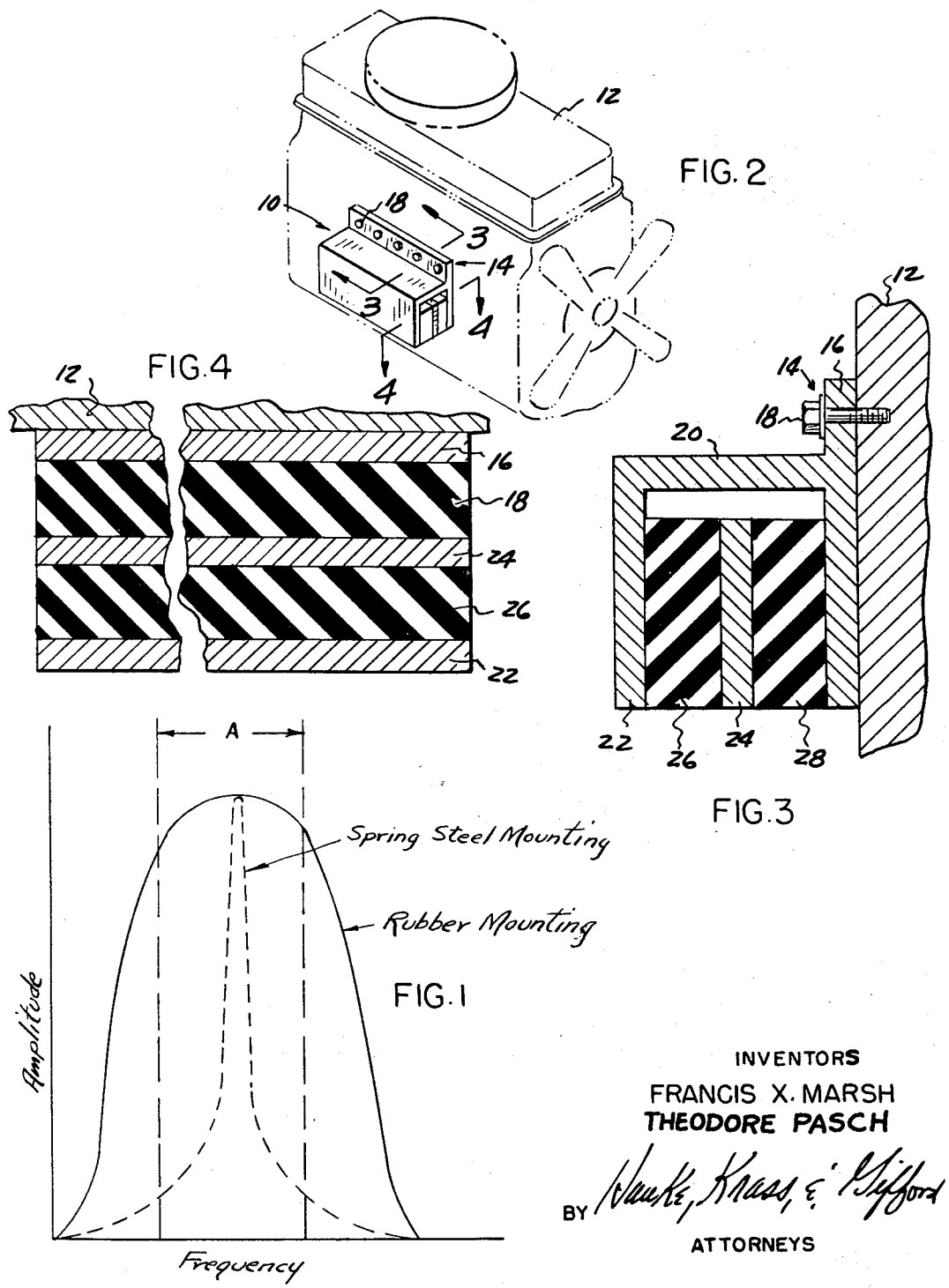

3,388,772
VIBRATION ABSORBER
Francis X. Marsh, Grosse Pointe Woods, and Theodore Pasch, North Muskegon, Mich., assignors to Continental Motors Corporation, Muskegon, Mich., a corporation of Virginia
Filed June 16, 1966, Ser. No. 558,119
3 Claims. (Cl. 188—1)

ABSTRACT OF THE DISCLOSURE

A vibration damper for internal combustion engines comprising a substantially U-shaped member having two spaced side members forming an opening, a heavy member mounted in the opening by means of rubber-like material adhering to each of the members and with one of the side members being mounted to the block of an engine.

---

The present invention relates to vibration absorbers and more particularly to a device adapted for attachment to a machine and that has a resiliently mounted mass for producing an inertial force sufficient to suppress vibratory motion of the machine produced by a disturbing force having a variable frequency.

The numerous moving parts of the modern internal combustion engine normally produce unbalanced dynamic forces which develop undesirable vibrations in the engine system and its associated components. Such vibrations, if severe enough, may cause the engine system to become dynamically unstable and produce destructive vibrations. In their less serious manifestations, vibrations reduce the effective operative life of the various components of the engine and when associated with a vehicle may produce an objectionable noise level.

In order to reduce the effects of engine vibrations, various approaches have been made in the prior art. These approaches include isolating the primary vibrating members so that the vibrations are not transmitted to neighboring structure to the detriment of the environment. Vibration isolators may take the form of springs, rubber mounts, cork padding and the like. Thus, as an example, automobile engines are supported on rubber mounts to reduce the transmission of engine vibrations to the remainder of the vehicle. Another approach to reducing the effects of vibrations and applicable in the case of machines having a rotating member takes the form of techniques for balancing the centrifugal forces so that there is no residual unbalance and consequent vibration. In general, balancing techniques include the addition or removal of correcting weights in one or more separated transverse planes to balance the rotating members. Still another approach to reducing the dynamic unbalance of engines comprises the utilization of an absorber which introduces an opposing force equal to that of the disturbing force to suppress the vibratory motion of the engine system. Normally the absorber includes a resiliently mounted mass free for movement to set up an inertial force counted to the disturbing force of the engine system and the size of which is established by the magnitude of the disturbing force and the allowable amplitude of the mass.

Utilization of absorbers of this type in the prior art has been limited with respect to internal combustion engines in that they are effective only at a single frequency. Thus, for a variable frequency disturbance, such as the automobile engine, the simple spring-mass absorber has been inadequate. Generally for variable speed rotational systems pendulum type absorbers having a natural frequency proportional to the rotational speed have been used. It is the broad purpose of the present invention to improve vibration absorbers by providing an absorber effective over a range of frequencies. For purposes of analysis, the engine system is normally considered as a spring-mass system comprising a resiliently supported mass with freedom to vibrate in a particular direction. A vibration absorber may be considered as a secondary spring-mass system which is excited for movement by the movement of the primary spring mass system which is caused by a disturbing force. The movement of the secondary spring-mass system produces an inertial force counter to the disturbing force so as to suppress the vibratory motion produced by the primary spring-mass system.

In the preferred embodiment of the present invention, the secondary spring mass system takes the form of a plate having a predetermined mass and which is suspended for vibratory movement between the sandwich type mounting of a rubber-like material. For purposes of analysis, the plate is considered as the mass in our spring-mass model and the rubber mounting is considered as the spring. The plate is preferably bonded to the rubber-like mountings which in turn are bonded between a pair of parallel spaced apart rigid members of a bracket adapted for connection to a vibration transmitting member of the machine.

The plate is excited for vibratory motion by vibrations transmitted from the machine and sets up effective counter vibrations over a broad range of frequencies. By selecting a suitable mass corresponding to the disturbing forces of the engine, vibrations due to unbalanced forces on the engine may be suppressed throughout the entire normal operating range of the engine. It can therefore be seen that an effective, vibration absorber illustrating a preferred embodiment of the invention is comprised of relatively few components which may be inexpensively fabricated and installed on the machine or to a frame member associated with the machine and which is extremely reliable and durable.

It is therefore an object of the present invention to reduce the vibration level of machines such as internal combustion engines which have moving parts which in their dynamic state create an unbalanced disturbing force on the machine by providing an independently mounted vibration absorber having a mass mounted to produce an inertial force opposing the unbalanced disturbing force to suppress the vibratory motions of the machine.

It is another object of the present invention to provide an improved vibration absorber for attachment to a vibration transmitting member of a machine comprising a bracket having a pair of parallel spaced apart flat members and a plate suspended between the two flat members by a rubber-like mounting which permits the plate to vibrate in response to the vibration transmitting member to which the bracket is connected with an amplitude sufficient to combine with the mass of the plate to produce an inertial force opposing the disturbing force of the machine.

Still another object of the present invention is to increase the effectiveness of vibration absorbers utilized in suppressing the vibrations of machines having a disturbing force of a variable magnitude by providing a vibration absorber having a mass suspended in a rubber-like mounting for producing a vibratory inertial force effective to reduce vibrations of an associated machine having a variable frequency.

Still further objects and advantages of the present invention will readily occur to one skilled in the art to which the invention pertains upon reference to the following detailed description which makes reference to the appended drawings and in which like reference characters refer to like parts throughout the several views and in which:

FIGURE 1 is a chart comparing the frequency range of vibratory motion of a mass suspended by rubber-type mountings as in the present invention and of a similar mass suspended for movement on a spring steel leaf member having a cantilever mounting;

FIGURE 2 is a perspective view of a vibration absorber mounted to an engine and illustrating a preferred embodiment of the present invention;

FIGURE 3 is a cross-sectional view as seen from line 3—3 of FIGURE 2; and

FIGURE 4 is a sectional view taken along lines 4—4 of FIGURE 2.

Now referring to the drawings, FIGURES 2 and 3 illustrate a preferred vibration absorber generally indicated at 10, attached to an engine 12 which in an uncorrected state experiences vibratory motions caused by unbalanced disturbing forces created by moving parts of the engine. The vibration absorber 10 includes a bracket 14 which has a mounting plate 16 connected to the engine block 12 by a plurality of bolts 18 which are threadably attached to the block of the engine. It is to be understood that although the bracket 14 is illustrated as being connected to the engine block, that it could as well be attached to any vibration transmitting member rigidly associated with the engine such as a mounting frame or the like. Normally, however, the absorber 10 will be more effective if rigidly mounted as close to the source of the disturbing engine forces as possible.

Now still referring to FIGURE 3, the plate member 16 preferably has a rectangular outline with the bolts 18 connected along an upper flange edge. A flat member 20 extends normally from the plate member 16 adjacent the bolts 18 and terminates at its outer end with a plate member 22 which is spaced from and parallel to the member 16 with corresponding lower and side edges. Thus it can be seen that the members 16, 20 and 22 provide a generally channel shaped bracket having a downwardly facing U-shaped cross-section.

A plate 24 is suspended for vibratory movement intermediate the inner surfaces of the members 16 and 22 and supportably mounted thereto by supporting member 26 and supporting member 28. Supporting members 26 and 28 are preferably formed of a resilient organic compound having rubber-like properties and which is preferably bonded to the plate 24 and to the members 16 and 22. The plate 24 has an upper edge which is spaced from the inner surface of the member 20 to a distance sufficient to permit the plate to vibrate. The plate 24 is mounted such that it vibrates in response to vibratory movement of the engine 12. The members 26 and 28 permit the plate 24 to vibrate with an amplitude sufficient that the moving mass of the plate produces an inertial force to counter the unbalanced forces causing the engine 12 to vibrate. This inertial force is sufficient to suppress or even to completely eliminate the vibratory movement of the engine 12. It can further be seen that in addition to producing a counter inertial force to the disturbing forces, that the rubber-like mountings absorb some of the energy transmitted to the vibration absorber 10.

FIGURE 1 illustrate the vastly improved results obtained by sandwiching the plate 24 between the rubber-like members 26 and 28 to produce a counter-force having the desired amplitude. The rubber-like members 26, 28 permit the plate 24 to vibrate over a range of frequencies. The plate 24 is chosen of a mass tuned to the disturbing forces of the engine such as it will produce an effective counter force throughout the normal operating range of the engine and which in FIGURE 1 is illustrated by the letter A. FIGURE 1 also illustrates the limitations of the conventional vibration absorber which normally takes the form of a mass adjustably connected to the free end of a leaf spring member and which when excited by the vibratory motion of the attached engine creates a counter force. The primary limitation limiting utilization of the conventional vibration absorber of this type, as can be seen in the chart, is that it is effective for a very narrow frequency range and thus is useless in an engine having a variable frequency range such as is normally encountered in an engine that is operated at a broad speed range.

It can therefore be seen that we have described in detail an improved vibration absorber which is independently mounted to a machine, formed of relatively few components, easy to manufacture and effective to suppress vibrations produced throughout the entire operating range of the machine.

It is to be understood that although we have described but one preferred embodiment of the present invention that many modifications and revisions may be made therein without departing from the spirit of the invention as expressed by the scope of the appended claims.

We claim:

1. In combination with a member to be damped, a vibration absorbing device comprising,
   (a) a channel shaped bracket having parallel side members joined along one pair of edges by a base member and with the opposite pair of edges being spaced to provide an opening and with one of said side members being mounted to said member to be damped in a manner such that the other of said side members is spaced from said members to be damped by said base member,
   (b) a flat relatively heavy plate and means suspending said plate intermediate said side members of said bracket,
   (c) said last mentioned means comprising rubber-like material bonding said plate to said side members and said base member such that said plate is disposed substantially parallel to said side members.

2. The combination as defined in claim 1 wherein said plate has a lesser surface area than the surface areas of said side members and is mounted with one edge spaced from said base member.

3. The combination as defined in claim 2 and in which said rubber-like material is spaced from said base member.

References Cited

UNITED STATES PATENTS

| 3,078,969 | 2/1963 | Campbell et al. | 188—1 X |
| 3,113,640 | 12/1963 | Stedman | 188—1 |
| 3,262,521 | 7/1966 | Warnaka | 188—1 |
| 3,324,974 | 6/1967 | Champlin et al. | 188—1 |

DUANE A. REGER, *Primary Examiner.*